US006286549B1

(12) United States Patent
Carse et al.

(10) Patent No.: US 6,286,549 B1
(45) Date of Patent: Sep. 11, 2001

(54) MIXING VALVE AND METHOD THEREFOR

(76) Inventors: Clifford Carlin Carse, deceased, late of Boulder City, NV (US); Ann G. M. Carse, executrix, 1630 Foothill Dr., Boulder City, NV (US) 89005

( * ) Notice: Subject to any disclaimer, the term of this patent is extended or adjusted under 35 U.S.C. 154(b) by 0 days.

(21) Appl. No.: 09/592,384

(22) Filed: Jun. 12, 2000

(51) Int. Cl.[7] .......... F16K 11/10
(52) U.S. Cl. .......... 137/607; 222/129.1
(58) Field of Search .......... 137/607, 898; 222/129.1

(56) References Cited

U.S. PATENT DOCUMENTS

| | | | | |
|---|---|---|---|---|
| 3,354,911 | * | 11/1967 | Fall | 137/625.69 |
| 4,619,378 | * | 10/1986 | Man | 222/144.5 |
| 4,765,513 | * | 8/1988 | McMillin et al. | 222/129.1 |
| 4,863,068 | * | 9/1989 | Smith | 222/129.1 |
| 4,887,740 | * | 12/1989 | Smith | 222/129.1 |
| 5,535,923 | * | 7/1996 | Fujioka | 222/148 |
| 5,601,210 | * | 2/1997 | Kelly et al. | 222/129.1 |
| 5,984,142 | * | 11/1999 | Castaldi | 222/129.1 |

* cited by examiner

*Primary Examiner*—John Fox
(74) *Attorney, Agent, or Firm*—Harry M. Weiss; Jeffrey Weiss; Weiss & Moy, P.C.

(57) ABSTRACT

A mixing valve and method, in which two fluids under pressure are supplied to a non-electric valve, in which the fluids are mixed and dispensed. The dispensing of fluids is controlled by a spring activated member, which in a non-activated closed position prevents the passage of fluids out of the mixing valve and which in an activated open position permits the passage, mixing and dispensing of the fluid intakes. In one embodiment, a third fluid inlet, which is selectively opened and closed by a second spring activated member, permits the passage and dispensing of one of the two fluid intakes.

14 Claims, 3 Drawing Sheets

MIXING VALVE AND METHOD THEREFOR

BACKGROUND OF THE INVENTION

1. Field of Invention

This invention relates generally to mixing valves for mixing and dispensing drinks and, more specifically, to a non-electric mixing valve and method activatable by pressure.

2. Background of the Invention

Mixing valves used to mix two fluid inputs and dispense them as a mixed soft drink are well known in the art. Prior art mixing valves are electrically powered, and utilize a compressor to force the ingredients to be mixed into the valve, where they can be mixed and dispensed. Electric mixing valves are relatively complicated and relatively expensive to manufacture.

A need therefore existed for a less expensive, less complicated mixing valve, capable of mixing soft drinks without the need for electric power. The non-electric mixing valve should be able to take advantage of the pressures created by carbonators and syrup pumps to activate the mixing and dispensing of the soft drink. The present invention satisfies these needs and provides other related advantages.

SUMMARY OF THE INVENTION

It is an object of the present invention to provide a non-electric mixing valve.

It is a further object of the present invention to provide a mixing valve that is pressure-activated.

It is still a further object of the present invention to provide a pressure-activated mixing valve capable of alternately dispensing non-carbonated water or carbonated water without the need for re-coupling the mixing valve.

BRIEF DESCRIPTION OF THE PREFERRED EMBODIMENTS

In accordance with one embodiment of the present invention, a mixing valve is disclosed. The mixing valve comprises, in combination: a first fluid inlet in fluid communication with a mixing chamber and adapted to receive a first fluid under pressure; a second fluid inlet in fluid communication with the first fluid inlet and adapted to receive a second fluid under pressure; and spring activated means located proximate an end of the first fluid inlet and having a non-depressed closed position and a depressed open position for alternately preventing each of the first fluid and the second fluid from departing the first fluid inlet and entering the mixing chamber and permitting each of the first fluid and the second fluid to depart the first fluid inlet and enter the mixing chamber.

In accordance with another embodiment of the present invention, a method for mixing and dispensing a drink is disclosed. The method comprises the steps of: providing a first fluid inlet in fluid communication with a mixing chamber and adapted to receive a first fluid under pressure; providing a second fluid inlet in fluid communication with the first fluid inlet and adapted to receive a second fluid under pressure; providing spring activated means located proximate an end of the first fluid inlet and having a non-depressed closed position and a depressed open position for alternately preventing each of the first fluid and the second fluid from departing the first fluid inlet and entering the mixing chamber and permitting each of the first fluid and the second fluid to depart the first fluid inlet and enter the mixing chamber; providing a first fluid under pressure to the first fluid inlet; providing a second fluid under pressure to the second fluid inlet; and depressing the spring activated means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
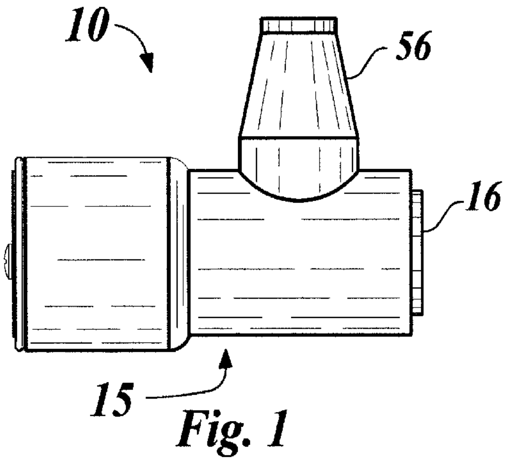
FIG. 1 is a right side view of one embodiment of the mixing valve of the present invention.
Figure 2:
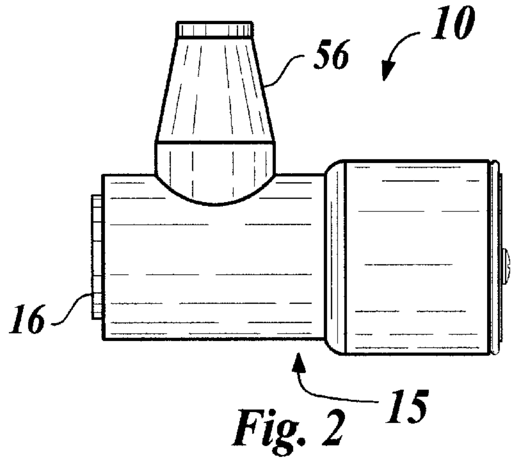
FIG. 2 is a left side view of the mixing valve of FIG. 1.
Figure 5:
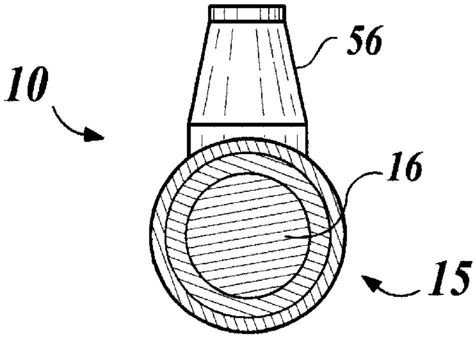
FIG. 5 is a first end view of the mixing valve of FIG. 1.
Figure 6:
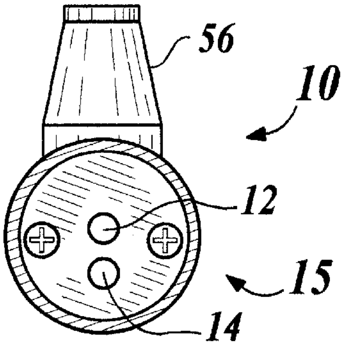
FIG. 6 is a second end view of one embodiment of the mixing valve of the present invention.
Figure 3:
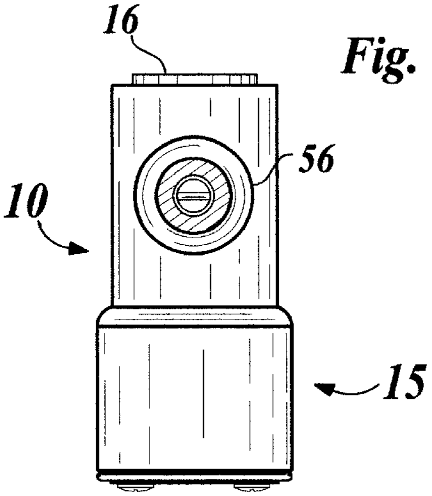
FIG. 3 is a top view of the mixing valve of FIG. 1.
Figure 7:
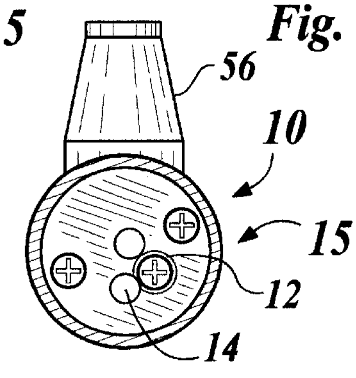
FIG. 7 is a second end view of one embodiment of the mixing valve of the present invention.
Figure 4:
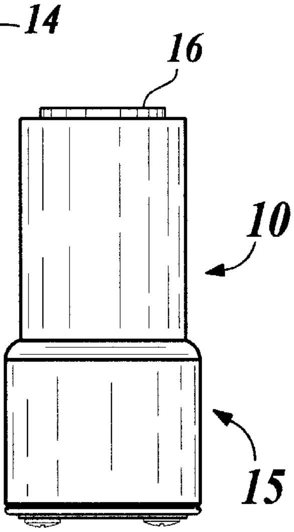
FIG. 4 is a bottom view of the mixing valve of FIG. 1.
Figure 8:
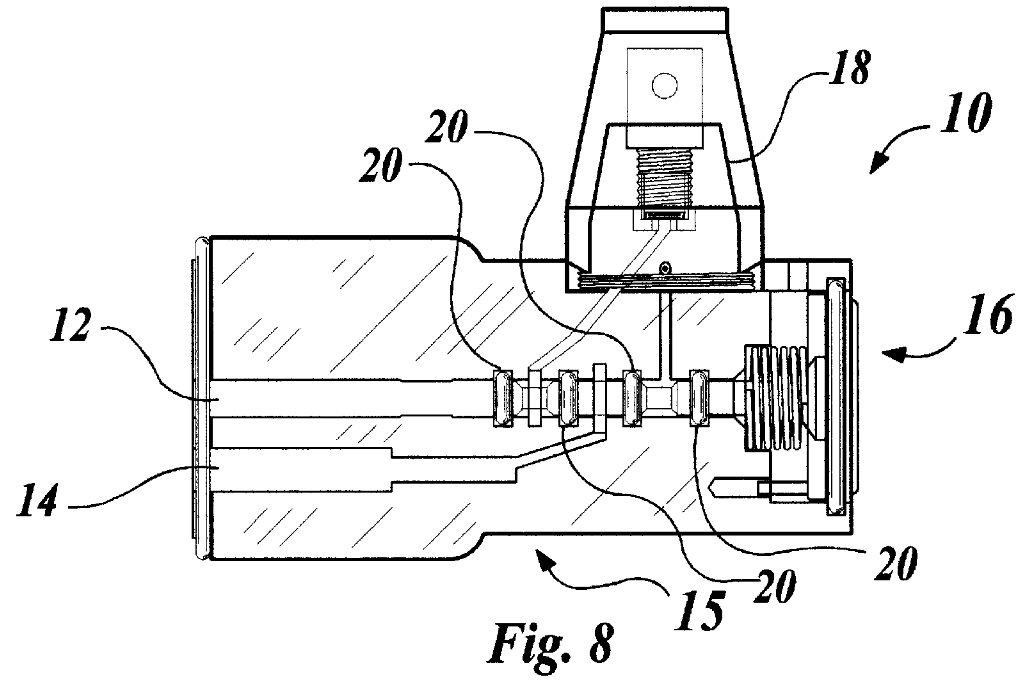
FIG. 8 is a side, cross-sectional view of one embodiment of the mixing valve of the present invention.
Figure 9:
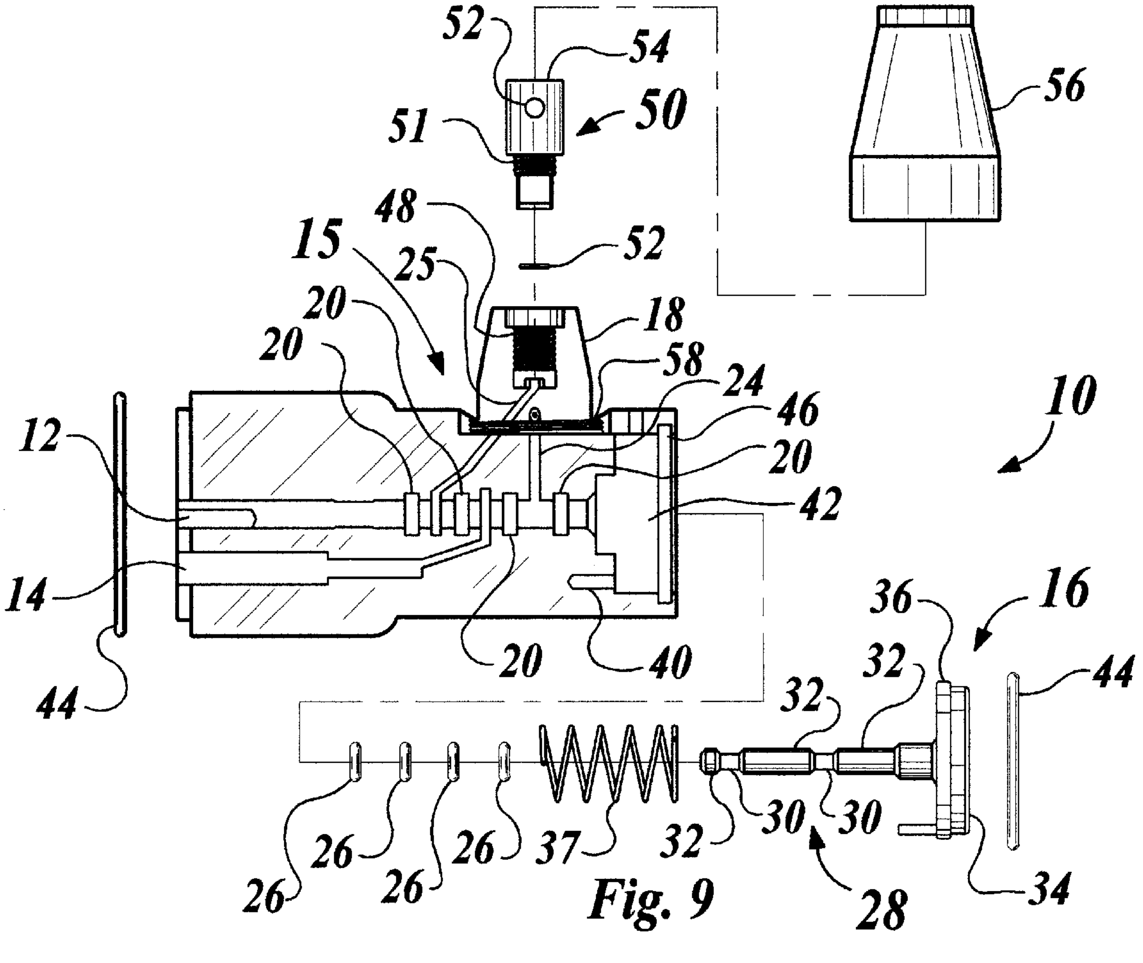
FIG. 9 is a side, cross-sectional, partially exploded view of one embodiment of the mixing valve of the present invention.

Referring to FIGS. 1–9 and 11–12, reference number 10 refers generally to an embodiment of the mixing valve of the present invention The mixing valve 10 generally comprises a first fluid inlet 12 and a second fluid inlet 14 located within a main body 15 of the mixing valve 10, an activator 16 which releases fluids from each of the first fluid inlet 12 and the second fluid inlet 14, and a mixing chamber 18 in which fluid from each of the first fluid inlet 12 and the second fluid inlet 4 is received and mixed. Referring specifically to FIG. 9, other than the activator 16, the main body 15 is preferably formed as a one-piece, machined plexiglass assembly having formed therein each of the first fluid inlet 12, the second fluid inlet 14, and the mixing chamber 18.

Referring now specifically to FIGS. 8–9 and 11–12, the flow of fluids through the first fluid inlet 12 and the second fluid inlet 14 and into the mixing chamber 18 are described in more detail. The first fluid inlet 12 preferably comprises a substantially axial bore, having preferably four zones 20 of increased diameter. The second fluid inlet 14, located above the first fluid inlet 12, is angled downward sow as to enter and be in fluid communication with the first fluid inlet 12. Fluid travelling through the second fluid inlet 14 and into the first fluid inlet 12 will continue to the mixing chamber 18 by passing through a third fluid inlet 24, which third fluid inlet 24 preferably extends at a right angle from the first fluid inlet 12 into the mixing chamber 18. Preferably, a brixing or mixing adjustment screw 25 (preferably comprising a 1/16" set screw) is positioned within a threaded opening in the main body 15 extending into the third fluid inlet 24, so as to permit adjustment of the amount of air entering the third fluid inlet 24. A fourth fluid inlet 22 transports fluid from the first fluid inlet 12 to the mixing chamber 18. The fourth fluid inlet 22 and the third fluid inlet 24, like the first fluid inlet 12 and the second fluid inlet 14, are preferably formed as part of the one-piece, machined main body 15.

Referring again specifically to FIG. 9, each zone 20 has an O-ring 26 positioned therein, for purposes of restricting fluid flow as explained herein. Referring now to the activator 16, it is preferably a one-piece plastic assembly comprising a shaft 28 having narrow regions 30 and wide regions 32, a button 34 with a lip 36 extending therearound, and a locating pin 38 extending from below the lip 36. The activator 16 is positioned within the main body 15, as shown in FIG. 9, by: (a) positioning a spring 37 about the shaft 28; (b) inserting the shaft 28 into the first fluid inlet 12; (c) inserting the locating pin 38 into a locating pin receiver 40; (d) positioning the spring 37 and button 34 within the receiving chamber 42; and (e) positioning an O-ring 44 above the lip 36 and within a channel 46 formed in the receiving chamber 42, which O-ring 44 maintains the activator 16 within the main body 15 and keeps the spring 37 in a partially-closed position.

Referring now to the mixing chamber 18, and still referring to FIG. 9, the mixing chamber 18 preferably has an interior threaded opening 48, which opening 48 receives a mixer 50 having an exterior threaded surface 51 dimensioned to mate with the threaded opening 48. The mixer 50 preferably has an O-ring 52 located inside the end of the mixer 50 that is inserted into the opening 48, so as to help ensure efficient fluid communication between the mixing chamber 18 and the mixer 50. The mixer 50 further comprises a mixing bar 52 located across the dispensing opening 54, to further assist in mixing fluids from the first fluid inlet 12 and the second fluid inlet 14. Finally, a mixing housing 56 is preferably threadably coupled over the mixing chamber 18 to a threaded area 58 located on an exterior portion of the mixing chamber 18. The mixing housing 56 serves to protect the mixing chamber 18 and mixer 50 during use, and further may be used to improve the overall appearance of the mixing valve 10 by being of a different color than other portions of the mixing valve 10.

Figure 10:
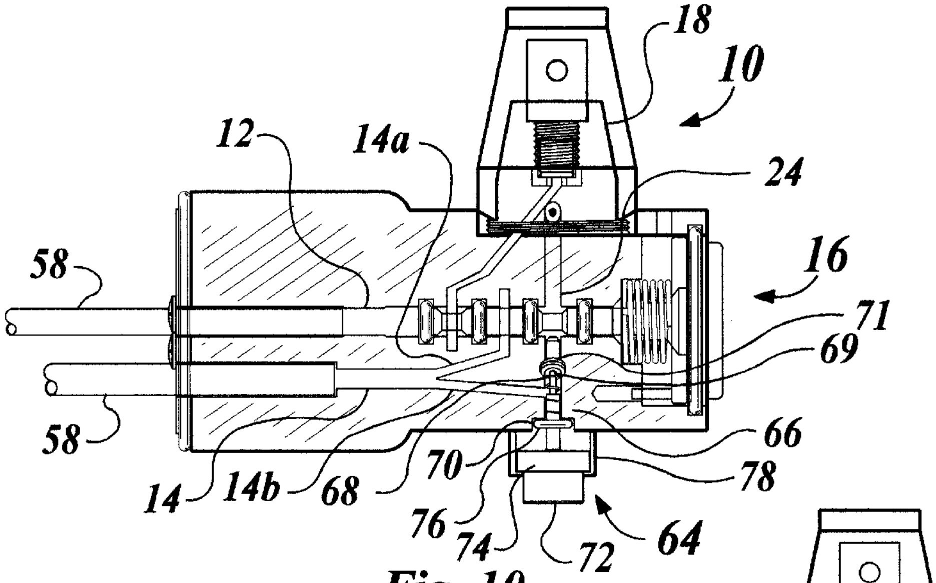
FIG. 10 is a side, cross-sectional view of one embodiment of the mixing valve of the present invention.
Figure 11:
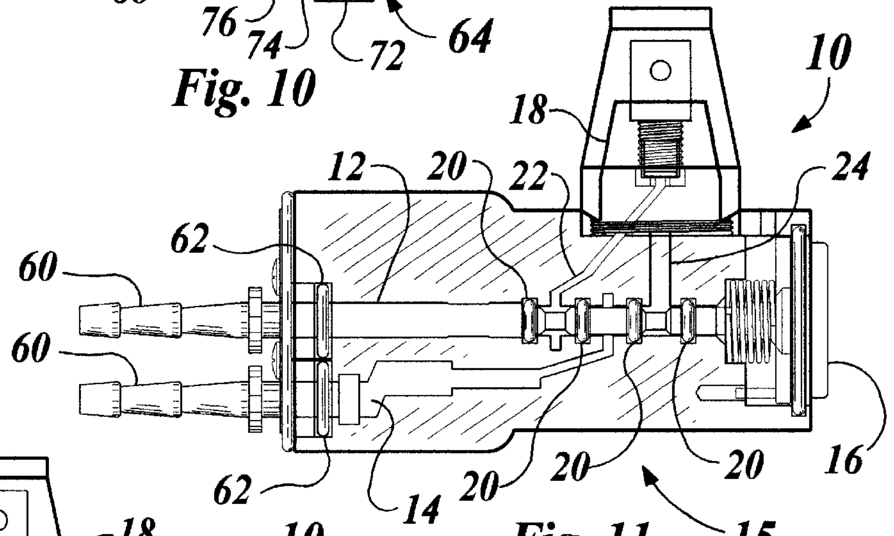
FIG. 11 is a side, cross-sectional view of one embodiment of the mixing valve of the present invention.
Figure 12:
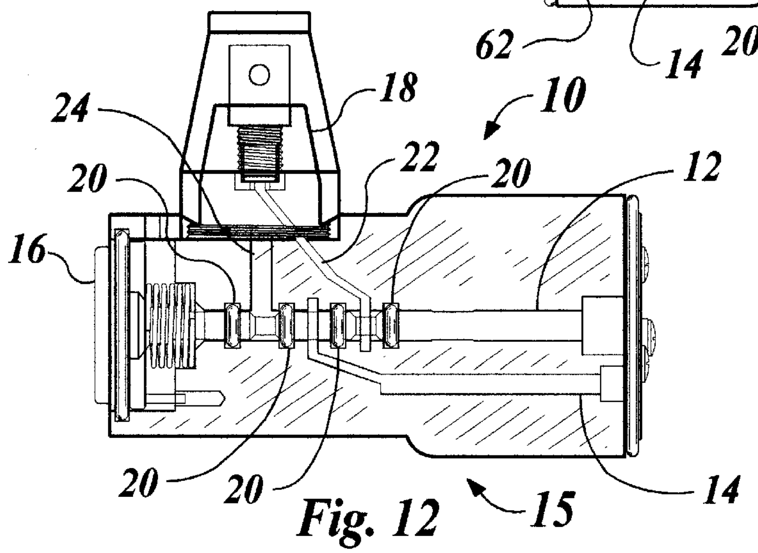
FIG. 12 is a side, cross-sectional view of one embodiment of the mixing valve of the present invention.

Referring now to FIGS. 10 and 11, communication between the first fluid inlet 12, the second fluid inlet 14, and their associated fluid sources (not shown) may be accomplished in different ways. As shown in FIG. 10, such communication can be accomplished by inserting first ends of plastic tubes 58 into each of the first fluid inlet 12 and the second fluid inlet 14, with second ends of the plastic tubes 58 being inserted into the associated fluid sources (not shown). Alternatively, as shown in FIG. 11, tube receivers 60 may be inserted into each of the first fluid inlet 12 and the second fluid inlet 14, which tube receivers 60 would then receiver tubes (not shown) leading to the associated fluid sources (not shown). To assist in creating a secure connection between the tube receivers 60 and each of the first fluid inlet 12 and the second fluid inlet 14, O-rings 62 may be positioned within expanded areas of each of the first fluid inlet 12 and second fluid inlet 14 as shown in FIG. 11.

FIG. 10 illustrates another embodiment of the mixing valve 10, referred to as a mixing valve 10'. The mixing valve 10' is identical to the mixing valve 10 in all respects discussed above, and equivalent reference numbers are used to so indicate, except as noted herein. In this embodiment, the third fluid inlet 24 extends through the entire cross-section of the main body 15, and has a zone 69 of increased diameter, into which is inserted an O-ring 71. Furthermore, the second fluid inlet 14 branches into two portions, one of which (14*a*) enters the first fluid inlet 12 as described above and the second of which (14*b*) enters the third fluid inlet 24. On a top portion of the main body 15, at the opening of the third fluid inlet 24 opposite the mixing chamber 18, a second activator 64 is located. The second activator 64 is preferably a one-piece plastic assembly comprising a shaft 66 having a narrow region 68 and a wide region 70, and a button 72 with a lip 74 extending therearound. The second activator 64 is positioned within the main boy 15, as shown in FIG. 10, by: (a) positioning a spring 76 about the shaft 66; (b) inserting the shaft 66 into the third fluid inlet 24; (c) positioning the spring 76 and button 72 within a threaded receiving chamber 78; and (d) threadably securing a collar 80 to the threaded receiving chamber 78 over the lip 74.

STATEMENT OF OPERATION

Referring first to the mixing valve 10, a fluid source is coupled to each of the first fluid inlet 12 and the second fluid inlet 14. This coupling is preferably accomplished using plastic tubes 58 inserted directly into each of the first fluid inlet 12 and the second fluid inlet 14 as shown in FIG. 10, or using plastic tubes (not shown) inserted into tube receivers 60 in each of the first fluid inlet 12 and the second fluid inlet 14 as shown in FIG. 11. Preferably, the fluid coupled to the first fluid inlet 12 is a syrup, which syrup would be dispensed by a pump, which pumps typically generate in the range of 40 pounds of pressure. The fluid coupled to the second fluid inlet 14 is preferably carbonated water. Typically, a carbonator generates in the range of 80 pounds of pressure. Of course, other fluids may be used as desired. The pressures generated by the syrup pump and carbonator (not shown) will power the mixing valve 10.

In its undepressed position, the activator 16 acts to prevent the passage of fluids from the first fluid inlet 12 and the second fluid inlet 14 to the mixing chamber 18. In this regard, when the activator 16 is undepressed, the wide regions 32 of the shaft 28 are aligned with O-rings 26 located within the zones 20, so as to prevent the passage of fluid from the first fluid inlet 12 into the mixing chamber 18 or from the second fluid inlet 14 to the first fluid inlet 12. When the activator 16 is depressed, the wide regions 32 move past the O-rings 26, so that the narrow regions 30 are aligned with the O-rings 26. This allows the fluid, which is under pressure by the syrup pump and carbonator, to move through the zones 20, through the first fluid inlet 12, into the mixing chamber 18, and out of the mixing chamber 18 and into a beverage holder of some kind (not shown).

Referring now to the mixing valve 10', a mixed drink comprising fluids passing through each of the first fluid inlet 12 and the second fluid inlet 14 may be dispensed in the manner described above with respect to the mixing valve 10. The mixing valve 10' further gives the user the flexibility to dispense only the fluid passing through the second fluid inlet 14—in this case carbonated water. This is accomplished by use of the second activator 64. In its undepressed position, the second activator 64 acts to prevent the passage of fluids from the portion 14*b* of the second fluid inlet 14 to the third fluid inlet 24 and into the mixing chamber 18. In this regard, when the second activator 64 is undepressed, the wide region 70 of the shaft 66 is aligned with O-ring 71 located within the zone 69, so as to prevent the passage of fluid from the portion 14*b* of the second fluid inlet 14 into the third fluid inlet 24 and into the mixing chamber 18. When the second activator 64 is depressed, the wide region 70 moves past the O-ring 71, so that the narrow region 68 is aligned with the O-ring 71. This allows the fluid entering the second fluid inlet 14, preferably carbonated water, which is under pressure by the carbonator, to move through the zone 69, through the third fluid inlet 24, into the mixing chamber 18, and out of the mixing chamber 18 and into a beverage holder of some kind (not shown).

While the invention has been particularly shown and described with reference to preferred embodiments thereof, it will be understood by those skilled in the art that the foregoing and other changes in form and details may be made therein without departing from the spirit and scope of the invention.

I claim:

1. A mixing valve comprising, in combination:

a first fluid inlet in fluid communication with a mixing chamber and adapted to receive a first fluid under pressure;

a second fluid inlet in fluid communication with said first fluid inlet and adapted to receive a second fluid under pressure; and spring activated means located proximate an end of said first fluid inlet and having a non-depressed closed position and a depressed open position for alternately preventing each of said first fluid and said second fluid from departing said first fluid inlet and entering said mixing chamber and permitting each of said first fluid and said second fluid to depart said first fluid inlet and enter said mixing chamber.

2. The mixing valve of claim 1 further comprising a housing adapted to be positioned over said mixing chamber.

3. The mixing valve of claim 1 further comprising a third fluid inlet in fluid communication with each of said first fluid inlet, said second fluid inlet and said mixing chamber.

4. The mixing valve of claim 1 wherein said first fluid inlet comprises a plurality of narrow regions and a plurality of wide regions each of said wide regions having an O-ring positioned therein and wherein said spring activated means comprises a shaft having narrow regions and wide regions wherein said wide regions of said shaft are positioned within said O-rings in said first fluid inlet in a substantially fluid tight condition when said spring activated means is in a non-depressed closed position and wherein said wide regions of said shaft are positioned without said O-rings so as to permit said first fluid to flow through said first fluid inlet when said spring activated means is in a depressed open position.

5. The mixing valve of claim 3 wherein each of said first fluid inlet, said second fluid inlet and said third fluid inlet are formed in a one piece machined plexiglass body.

6. The mixing valve of claim 3 further comprising second spring activated means located proximate an end of said third fluid inlet means and having a non-depressed closed position and a depressed open position for alternately preventing said second fluid from departing said second fluid inlet and entering said third fluid inlet and said mixing chamber and permitting said second fluid to depart said third fluid inlet and enter said mixing chamber.

7. The mixing valve of claim 6 wherein said third fluid inlet comprises at least one narrow region and at least one wide region said wide region having an O-ring positioned therein and wherein said second spring activated means comprises a shaft having at least one narrow region and at least one wide regions wherein said wide region of said shaft is positioned within said O-ring in said third fluid inlet in a substantially fluid tight condition when said second spring activated means is in a non-depressed closed position and wherein said wide region of said shaft is positioned without said O-ring so as to permit said second fluid to flow through said third fluid inlet when said second spring activated means is in a depressed open position.

8. A method of mixing and dispensing a drink comprising the steps of:

providing a first fluid inlet in fluid communication with a mixing chamber and adapted to receive a first fluid under pressure;

providing a second fluid inlet in fluid communication with said first fluid inlet and adapted to receive a second fluid under pressure;

providing spring activated means located proximate an end of said first fluid inlet and having a non-depressed closed position and a depressed open position for alternately preventing each of said first fluid and said second fluid from departing said first fluid inlet and entering said mixing chamber and permitting each of said first fluid and said second fluid to depart said first fluid inlet and enter said mixing chamber;

providing a first fluid under pressure to said first fluid inlet;

providing a second fluid under pressure to said second fluid inlet; and depressing said spring activated means.

9. The method of claim 8 further comprising the step of positioning a housing over said mixing chamber.

10. The method of claim 8 further comprising the step of providing a third fluid inlet in fluid communication with each of said first fluid inlet, said second fluid inlet and said mixing chamber.

11. The method of claim 8 wherein said first fluid inlet comprises a plurality of narrow regions and a plurality of wide regions each of said wide regions having an O-ring positioned therein and wherein said spring activated means comprises a shaft having narrow regions and wide regions wherein said wide regions of said shaft are positioned within said O-rings in said first fluid inlet in a substantially fluid tight condition when said spring activated means is in a non-depressed closed position and wherein said wide regions of said shaft are positioned without said O-rings so as to permit said first fluid to flow through said first fluid inlet when said spring activated means is in a depressed open position.

12. The method of claim 10 wherein said steps of providing said first fluid inlet, said second fluid inlet and said third fluid inlet further comprises the step of forming said first fluid inlet, said second fluid inlet and said third fluid inlet in a one piece machined plexiglass body.

13. The method of claim 10 further comprising the step of providing second spring activated means located proximate an end of said third fluid inlet means and having a non-depressed closed position and a depressed open position for alternately preventing said second fluid from departing said second fluid inlet and entering said third fluid inlet and said mixing chamber and permitting said second fluid to depart said third fluid inlet and enter said mixing chamber.

14. The method of claim 13 wherein said third fluid inlet comprises at least one narrow region and at least one wide region said wide region having an O-ring positioned therein and wherein said second spring activated means comprises a shaft having at least one narrow region and at least one wide regions wherein said wide region of said shaft is positioned within said O-ring in said third fluid inlet in a substantially fluid tight condition when said second spring activated means is in a non-depressed closed position and wherein said wide region of said shaft is positioned without said O-ring s o as to permit said second fluid to flow through said third fluid inlet when said second spring activated means is in a depressed open position.

* * * * *